United States Patent [19]

Blakey et al.

[11] 4,256,721
[45] Mar. 17, 1981

[54] COMBUSTION METHOD AND APPARATUS

[75] Inventors: Philip G. Blakey, Riddings; Richard W. Watson, Allestree, both of England

[73] Assignee: BOC Limited, London, England

[21] Appl. No.: 14,674

[22] Filed: Feb. 23, 1979

[51] Int. Cl.³ .................. C01B 17/50; C01B 17/90; C01B 17/74
[52] U.S. Cl. .................. 423/540; 423/525; 423/531
[58] Field of Search .............. 423/522, 531, 54 D, 423/541 A, 541 R, 542, 525

[56] References Cited

U.S. PATENT DOCUMENTS

| | | | |
|---|---|---|---|
| 2,417,386 | 3/1947 | Titlestad | 423/522 |
| 2,644,797 | 7/1953 | Shiffler | 423/531 |
| 2,789,035 | 4/1957 | Hurlburt | 423/540 |
| 3,359,069 | 12/1969 | Furkert et al. | 423/540 |
| 3,908,904 | 9/1975 | Kerner | 423/531 |

FOREIGN PATENT DOCUMENTS 2506438  8/1976  Fed. Rep. of Germany .......... 423/540

*Primary Examiner*—O. R. Vertiz
*Assistant Examiner*—Gary P. Straub
*Attorney, Agent, or Firm*—David L. Rae; Larry R. Cassett; Edmund W. Bopp

[57] ABSTRACT

In a process for thermally cracking waste sulphuric acid, a combustible material is mixed with such acid and the mixture is supplied to a burner to which a flow of atomizing air is also supplied. A flow of secondary air which is enriched to about 23–40% by volume of oxygen is injected into a flame generated by burning said waste sulphuric acid-combustible material mixture to thereby thermally crack such acid while reducing the production of by-product sulphur trioxide.

4 Claims, 1 Drawing Figure

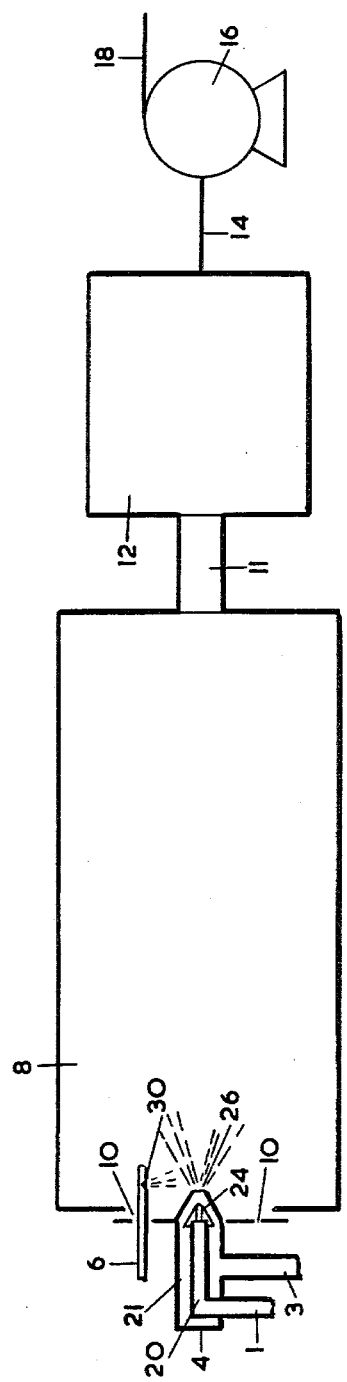

COMBUSTION METHOD AND APPARATUS

This invention relates to a combustion process and apparatus. In particular, it relates to a process and apparatus for burning or thermally cracking waste sulphuric acid.

In a number of commercial operations impure sulphuric acid is formed. The impurities may typically be hydrocarbons containing 5 or more carbon atoms, acrylates, methacrylates, acrylic acid and other combustible organic compounds. Alternatively, the waste sulphuric acid may contain hydrogen sulphide or other sulphide as an impurity. The impure or contaminated sulphuric acid is not generally suitable for re-use commercially and is thus burnt and typically a sulphur dioxide containing gas is recovered from the combustion products.

Waste sulphuric acid burners are well known and have been used in industry for 20 or more years. They typically include one or more tubes or nozzles through which waste sulphuric acid and any liquid fuel to be burnt therewith are supplied. Typically, the burners are situated in a combustion chamber having an outlet in communication with a waste heat boiler effective to cool the combustion gases. In practice, it is found that unreacted material is often carried over into the waste heat boiler with the combustion products and consequently sulphide deposits are formed on the boiler tubes thereby tending to block the tubes and to reduce the effiency of heat exchange. Moreover, there may also be deposition of dust and ash in the boiler tubes. In addition, the yield of sulphur dioxide is lower than that which can be obtained theoretically. Another disadvantage associated with the operation of waste sulphuric acid burners is that there is sometimes formation of free sulphur. These problems may arise in both types of conventionally used combustion apparatus, namely induced draught apparatus in which the combustion chamber is subjected to a vacuum, and forced draft apparatus in which the combustion chamber is operated at above atmospheric pressure.

According to the present invention there is provided a process of thermally cracking sulphuric acid comprising:
(a) supplying a stream of spent sulphuric acid to a first passage of a burner in communication with a combustion chamber, the sulphuric acid having dissolved therein or mixed therewith combustible matter;
(b) supplying a stream of atomising air to a second passage in the burner so as to atomise the sulphuric acid;
(c) supplying a stream of secondary air to the combustion chamber separately from the burner so as to provide oxygen-containing atmosphere in the vicinity of the flame issuing from the burner in operation of the burner;
(d) mixing with the secondary air oxygen or a gas mixture containing at least 35% by volume of oxygen and
(e) initiating combustion of the combustible material so as to generate the heat necessary for the thermal cracking of the sulphuric acid.

Preferably, the rates of supplying secondary air and the oxygen, or gas mixture containing oxygen, are such that the concentration of oxygen in the secondary air is increased to 23 to 27% by volume, (though if desired this concentration could be greater) or, if the secondary air does not become fully mixed with the oxygen or gas-mixture containing oxygen, the relative rates of supply should preferably be such that were the two gases to become fully mixed with the concentration of oxygen in the secondary air would be raised to a level in the range 23 to 27% by volume (though if desired this concentration could be greater).

If the burner uses a relatively large supply of atomising air, such that a significant portion of the combustible matter in the feed is burnt using only the atomising air to support combustion, for example, if 10% by volume of the total air is provided by the atomising air, it may be possible to add some oxygen or oxygen-enriched air to the atomising air as well as to the secondary air.

In addition, it is preferred that the total rate of supplying oxygen or oxygen-containing gas mixture, primary air and secondary air be such that the combustion gases leaving the burner contain from 2 to 4% by volume of oxygen. This limits the formation of sulphur trioxide while ensuring a safe margin of operation above stoichiometric requirements.

The invention also provided apparatus for thermally cracking sulphuric acid having:
(a) in communication with a combustion chamber at least one burner having a first passage for sulphuric acid and a second passage for atomising air;
(b) means for creating a flow of secondary air over the burner or burners;
(c) means for introducing oxygen or a gas mixture containing at least 35% by volume of oxygen into the secondary air.

In an induced draught combustion chamber there is a port or other inlet for secondary air located near to the or each burner such that in operation the secondary air is induced into the combustion zone of the or each flame. Typically, the oxygen or gas mixture containing oxygen may be introduced into the secondary air through one or more lances. If desired, the or each lance may be positioned in one or more ports or inlets through which the secondary air enters the combustion chamber. The or each lance may be positioned such that oxygen impinges directly upon the flame without becoming fully mixed with the secondary air. Typically, the or each lance may have its longitudinal axis parallel to that of its associated burner, and have an outlet adapted to direct the oxygen or gas mixture containing oxygen into the flame of the associated burner.

Typically, the combustion chamber communicates with the waste heat boiler. If desired, the concentration of oxygen in the gas leaving the combustion chamber may be monitored, and the flow of atomising (primary) or secondary air, or both, adjusted so as to keep the oxygen concentration within the range 2 to 4% by volume. Preferably, it is just the flow of secondary air that is adjusted.

If the combustion chamber is of the forced draught type, the secondary air will be supplied to it under pressure through suitable means. Typically, the oxygen or gas mixture containing at least 35% by volume of oxygen will be introduced into a main conduit for the secondary air through suitable means, for example a diffuser, or if the oxygen is supplied in liquid state, a spray nozzle.

The addition of oxygen to a flame causes it to burn more intensely and to increase the flame speed. In consequence, the cracking of the sulphuric acid takes place in a smaller volume thus shortening the flame length and increasing the flame temperature. The minimum cracking temperature of the sulphuric acid is 1800° F. and the rate of thermal cracking increases with temperature. Thus, the addition of oxygen or oxygen-containing gas mixture to the secondary air makes possible an increased flame temperature, a shorter flame length and an increased rate of conversion of sulphuric acid to sulphur dioxide. In addition, a higher flame temperature reduces sulphur trioxide formation.

The invention also makes possible a lower rate of flow of gas through the combustion chamber thereby enhancing the tendency of ash and dust and other solids to come out of entrainment with the gas passing through the combustion chamber before this gas reaches the waste heat boiler. This helps to reduce the tendency for the waste heat boiler tubes to become blocked.

The waste sulphuric acid for burning in accordance with the invention may typically contain about 55 to 97% by weight of sulphuric acid and from 1 to 20% by weight of hydrocarbons. If the proportion of hydrocarbons or other combustible material (which may be gaseous, liquid or solid) is low, fuel (preferably either gaseous or liquid) is preferably added to the waste sulphuric acid before it enters the first passage of the burner or is supplied separately. This helps to produce a stable flame. However, in comparison with a comparable burner operated by previously known methods, we believe the method according to the present invention makes possible burning of the waste sulphuric acid to form sulphur dioxide using less added fuel. Analogously, if it has been the practice from a conventional combustion apparatus to add fresh sulphuric acid to the waste sulphuric acid so as to give a stable flame, by converting the conventional combustion apparatus to perform the method according to the invention possible to reduce or eliminate the amount of fresh acid so added. It is to be appreciated that existing combustion apparatus for burning sulphuric acid may, in general, readily be converted to perform the method according to the invention.

If desired, a custom built plant for thermally cracking waste sulphuric acid and using the resulting sulphur dioxide containing gas mixture to form fresh sulphuric acid, may contain the apparatus according to the invention, and may be used to perform the method according to the invention. By using this expedient we believe it possible to increase the sulphur dioxide concentration of the gas leaving the combustion chamber to a value greater than it would be otherwise were oxygen-enrichment of the air supporting combustion not to be practised (in which case the sulphur dioxide concentration in the aforesaid gas mixture may typically be in the order of 4 to 8% by weight. We believe that this practice will considerably reduce the capital cost of the plant, and may be particularly advantageous if a feedstock comprising waste or spent sulphuric acid in admixture with methacrylate is employed.

The method and apparatus according to the present invention will now be described by way of example with reference to the accompanying drawing which is a diagrammatic representation of apparatus for burning sulphuric acid.

Referring to the drawing, a combustion chamber 8 has mounted in one of its walls a burner 4 having an inner passage 20 in communication with an inlet 1 and an outer annular passage 22 in communication with an inlet 3. The passage 20 terminates in an atomising nozzle 24 positioned slightly upstream of the tip 26 of the burner. The passage 21, which surrounds the passage 20, terminates at the tip of the burner 4. Located on either side of the burner 4 are ports 10 in the wall of the combustion chamber 8. Through one of these ports 10 an oxygen lance 6 extends into the interior of the combustion chamber 8. The lance 6 has its longitudinal axis parallel to that of the burner 4 and has in its side at a region approximately level with the tip of the burner 4 an outlet 30 through which the oxygen can leave the lance.

Opposite the burner 4 the chamber has an outlet passage 11 in communication with a waste heat boiler 12 which in turn has an outlet 14 in communication with a pump 16 and an outlet 18.

Although not shown, the burner 4 has means for igniting a combustible mixture passed through it. Typically, such means may comprise means for generating a pilot flame, or a piezoelectric spark igniter. However, other ignition means may be used, and it is possible even to light the burner manually by application of a flame.

In operation, waste sulphuric acid is pumped into the burner 4 through the passage 1 and atomising air is supplied to the burner through the passage 3. The waste acid flows through the passage 20 and is atomised as it passes through the atomising nozzle 22 and the primary air flows through the passage 21 surrounding the passage 20. The compressor or blower 16 is effective to induce a flow of air into the combustion chamber 8 through the ports 10. Oxygen may be added to this air through the lance 6 from a source of oxygen (not shown).

The mixture of air and sulphuric acid (including hydrocarbon or other combustible material) leaving the burner 4 may be ignited. Oxygen added through the lance 6 will then diverge from the outlet of the lance and pass into the flame produced as a result of the combustion of the combustible material in the sulphuric acid. The products of combustion and of thermal cracking are then drawn through the combustion chamber 8 by the action of the compressor or blower 16. Typically, this compressor or blower will create a vacuum of 1 inch of mercury in the chamber 8.

The combustion products leave the chamber 8 via the outlet 11 to flow into the waste heat boiler 12 where they are cooled to a temperature of approximately 300° to 450° C. The gases flow into the compressor 16 and then into the outlet 18. Typically, the gases may contain from 2 to 4% by volume of oxygen and from 6 to 20% by volume of sulphur dioxide.

The resulting sulphur dioxide containing gas may be used to make further sulphuric acid. Alternatively, it can be purified and the resultant pure sulphur dioxide collected.

Another alternative is to pass the sulphur dioxide containing gas into a scrubber so as to form an alkali sulphite or sulphate.

If it is required to produce sulphur dioxide as a final product, then the amount of oxygen added to the secondary air may be higher than that previously stated as preferred.

The invention is further illustrated by the following example:

EXAMPLE

A feedstock consisting of 2,800 lbs per hour of waste sulphuric acid consisting of 85% by weight of sulphuric acid and 8% by weight of hydrocarbons of average formula C15 H32 is passed into the passage 1 of the burner 4 and burnt. In the combustion process, the secondary combustion air is enriched with oxygen to form a gas mixture containing 25% by volume of oxygen. The temperature of the gas leaving the burner is in the order of 1250° F. The oxygen content of the gas leaving the combustion chamber is maintained at between 2 to 4% by volume (wet basis).

Typically, the gas leaving the combustion chamber 8 consists of carbon dioxide, oxygen, nitrogen, sulphur dioxide, and water vapour and contains traces of sulphur trioxide and sulphuric acid. The gas may typically contain 16% by volume of sulphur dioxide and 16% by volume of carbon dioxide. If it is to be used to form fresh sulphuric acid it may typically be diluted with air to reduce the concentration of sulphur dioxide to 8 to 10% by volume before being passed into the converter of a standard plant for producing sulphuric acid.

We claim:

1. A process of thermally cracking waste sulphuric acid to produce sulphur dioxide comprising
   (a) supplying a stream of waste sulphuric acid to a first passage of a burner in communication with a combustion chamber, the sulphuric acid having dissolved therein or mixed therewith combustible matter;
   (b) supplying a stream of atomising air to a second passage in the burner so as to atomise the sulphuric acid and combustible matter;
   (c) supplying a stream of secondary air to the combustion chamber separately from the burner so as to provide an oxygen containing atmosphere in the vicinity of the flame issuing from the burner in operation of the burner;
   (d) initiating combustion of the combustible matter so as to generate the heat necessary for said thermal cracking;
   the improvement comprising
   (e) injecting oxygen or an oxygen gas mixture containing at least 35% oxygen by volume into the combustion chamber separately from the burner and into direct contact with a flame issuing from the burner in operation of the burner.

2. A process as claimed in claim 1 in which the rates of supplying said oxygen or oxygen-containing gas mixture, secondary air and atomising air are such that the combustion gases leaving the burner contain from 2 to 4% by volume of oxygen.

3. A process as defined in claim 1 in which the waste sulphuric acid contains from 55–97% by weight of sulphuric acid and from 1 to 20% by weight of combustible matter in the form of hydrocarbons.

4. A process as claimed in claim 1, in which combustible materials are added to the waste sulphuric acid before it enters the first passage of the burner or is supplied separately to the burner.

* * * * *